United States Patent [19]

Lin

[11] Patent Number: 5,436,303

[45] Date of Patent: Jul. 25, 1995

[54] FLUOROSILICONE PRESSURE SENSITIVE ADHESIVES

[75] Inventor: Shaow B. Lin, Schenectady, N.Y.

[73] Assignee: General Electric Company, Waterford, N.Y.

[21] Appl. No.: 65,061

[22] Filed: May 20, 1993

Related U.S. Application Data

[63] Continuation of Ser. No. 823,234, Jan. 21, 1992, abandoned.

[51] Int. Cl.$^6$ .................... C08L 83/06; C08L 83/04
[52] U.S. Cl. .................................. 525/477; 528/24
[58] Field of Search .......................... 525/477

[56] References Cited

U.S. PATENT DOCUMENTS

| | | | |
|---|---|---|---|
| 3,983,298 | 9/1976 | Hahn et al. | 260/46.5 UA |
| 4,041,010 | 8/1977 | Jeram | 260/42.26 |
| 4,322,518 | 3/1982 | Blizzard | 528/15 |
| 4,465,805 | 8/1984 | Blizzard et al. | 524/765 |
| 4,774,297 | 9/1988 | Murakami et al. | 528/478 |
| 4,960,811 | 10/1990 | Evans | 524/265 |
| 4,972,037 | 11/1990 | Garbe et al. | 526/245 |
| 4,980,443 | 12/1990 | Kendziorski et al. | 528/31 |
| 4,988,779 | 1/1991 | Medford et al. | 525/478 |
| 5,120,810 | 6/1992 | Fujiki et al. | 528/15 |
| 5,248,716 | 9/1993 | Lin et al. | 525/477 |

FOREIGN PATENT DOCUMENTS

| | | |
|---|---|---|
| 0269454 | 6/1988 | European Pat. Off. |
| 0315333 | 10/1989 | European Pat. Off. |
| 0355991 | 2/1990 | European Pat. Off. |

OTHER PUBLICATIONS

Noll, *Chemistry and Technology of Silicones*, 1968, pp. 271 to 277.

*Primary Examiner*—Melvyn I. Marquis
*Assistant Examiner*—Margaret W. Glass

[57] ABSTRACT

A fluorosilicone pressure sensitive adhesive (PSA) having high solvent resistance is disclosed, The PSA is formed of (A) from about 5 to 70 percent fluorosilicone polymers; (B) from about 10 to 60 percent of a silanol containing MQ resin; and (C) from about 10 to 50 percent of resin compatible diorganosiloxane polymers and may be diluted and cured in the presence of a catalyst or initiator.

23 Claims, 1 Drawing Sheet

FLUOROSILICONE PRESSURE SENSITIVE ADHESIVES

This is a continuation of application Ser. No. 07/823,234 filed on Jan. 21, 1992, now abandoned.

BACKGROUND OF THE INVENTION

The present invention relates to silicone compositions suitable for forming pressure sensitive adhesive compositions. More particularly, the present invention relates to free radical curable fluorosilicone compositions which cure to form pressure sensitive adhesive compositions having excellent fuel and solvent resistance, while maintaining good tack and peel adhesion properties.

The term "pressure sensitive adhesive" (PSA), as used herein, refers to adhesives that can be adhered to a surface and yet can be removed from the surface without transferring more than trace quantities of adhesive to the surface and can be readhered to the same or another surface because the adhesive retains some or all of its adhesive strength. In other words, an adhesive whose cohesive strength is higher or better than its adhesive strength is referred to as a pressure sensitive adhesive.

Silicone PSAs have excellent cohesive strength, tack and peel adhesion strength, which are properties generally required of pressure sensitive adhesives. In addition, they also have heat resistance, cold resistance, electrical properties, and the like, characteristic of silicones, and so are widely used for electrical-insulating tape which must be highly reliable, and for various pressure-sensitive products which must be resistant to hot and cold environments.

A drawback associated with the use of silicone PSAs is that when exposed to organic solvents such as toluene, cured silicone pressure sensitive adhesives swell and loose desirable peel and tack properties in the swollen state. Solvent-sensitivity can limit applications where frequent or even occasional exposure to harsh environments occurs.

Silicone compositions containing resinous siloxane copolymers (so-called MQ resins) and polyorganosiloxanes capable of curing to form pressure sensitive adhesive compositions are known in the art. It is also known that in such Compositions a relatively large proportion by weight of resinous siloxane copolymers is required to achieve satisfactory adhesive properties. However, these resinous copolymers are a particularly solvent-sensitive species in the compositions.

It is known that fluoro-containing polymers and fluoro-organo polymers are solvent resistant, but do not mix readily with siloxanes and tend to separate from nonfluoro compounds such as MQ resins. These materials have not been generally used for PSAs. Further, few organic solvents are available to prepare solutions containing both fluorosilicone polymers and resinous siloxanes.

U.S. Pat. No. 4,980,443 (Kendziorski et al.) is directed to a curable organo hydrogen polysiloxane compound and a fluorosilicone polymer mixed therein to provide coating compositions useful for a release liner to protect silicone pressure sensitive adhesives. Kendziorski et al. does not disclose a pressure sensitive adhesive employing an MQ resin and a fluorosilicone.

U.S. Pat. No. 4,972,037 (Garbe et al.) is directed to various compositions including adhesives, surface modifying compositions, sealing compositions and topical binders formed of copolymers having a vinyl polymeric backbone with grafted pendant siloxane polymeric moieties. In the patent, pressure sensitivity of the adhesive is varied. The non-pressure sensitive compounds include fluoro compositions.

U.S. Pat. No. 4,465,805 (Blizzard et al.) is directed to curable, hydrocarbon liquid resistant fluorosilicones which include the reaction product of an MQ resin, and a polydiorganosiloxane, a vinyl or hydroxyl fluorosilicone and a catalyst. The material may be formed into elastomers and coatings for various substrates.

European Patent Application No. 0355991 (Boardman) is directed to a pressure sensitive adhesive composition containing (A) a benzene soluble resinous copolymer (an MQ resin); (B) a diorganoalkenylsiloxy end blocked polydiorganosiloxane; (C) a polydiorganohydrogensiloxy endblocked polydiorganosiloxane, (B) and (C) having 0 to 1,000 repeating units, (D) a cross-linking agent, and (E) a hydrosilation catalyst. Boardman shows a relatively high MQ resin content and does not disclose or suggest that fluorosilicone components would provide useful properties.

U.S. Pat. No. 3,983,298 (Hahn et al.) is directed to a composition suitable for use as a pressure sensitive adhesive containing 50 to 60 parts of an MQ resin and relatively high viscosity polyorganosiloxanes.

U.S. Pat. No. 4,774,297 (Murakami et al.) is directed to the preparation of pressure sensitive adhesives using vinyl functional polysiloxanes and 70–30 parts by weight of an organopolysiloxane containing M and Q units.

European Patent Application No. 0269454 (Murakami et al.) discloses a composition suitable for forming pressure sensitive adhesives including an alkenyl group-containing silicone polymer, a tackifying silicone resin and a organohydrogensiloxane, and a platinum containing catalyst. The patent does not disclose pressure sensitive adhesives using solvent resistant fluorosilicones.

U.S. Pat. No. 4,988,779 (Medford et al.) discloses a composition suitable for forming a pressure sensitive adhesive employing an MQ resin (50–70 parts) and organopolyoxanes.

It is desirable to provide solvent resistant fluoro-containing polyorganosiloxane compositions which cure to yield silicone pressure sensitive adhesives having desirable properties. In the present invention, it was found that a free radical curable silicone composition having a high weight percent of fluorosilicone polymers, a reduced amount of silanol containing MQ resins and compatible diorganosiloxane polymers can be cured to form solvent resistant, pressure sensitive adhesives with good tack and peel adhesion.

SUMMARY OF THE INVENTION

A fluorosilicone composition curable to produce a pressure sensitive adhesive having high solvent and fuel resistance while exhibiting good pressure sensitive properties is produced by reacting:

(A) about 5 to 70 weight percent fluorosilicone polymers;

(B) about 10 to 60 weight percent of a silanol containing siloxane MQ resin;

(C) about 10 to 50 weight percent of resin compatible diorganosiloxane polymers, the total of (A), (B) and (C) being 100;

(D) a diluent solvent; and (E) a free radical generating cross-linking initiator, or catalyst.

The fluorosilicone polymer preferably has a viscosity of at least 5,000 cps at 25° C. and comprises at least one of high a molecular weight (HMW) fluorosilicone (FS) gum and fluid. Preferred FS structures contain silicon bonded methyl groups including alkyls containing from 1 to about 8 carbon atoms; fluorochemicals such as trifluoroalkyls of 1 to about 8 carbon atoms, fluoroalkyl cyclics of 1 to about 8 carbon atoms, perfluorinated alkyls of 1 to about 8 carbon atoms, perfluorinated cyclics of 1 to about 8 carbon atoms and partially or fully fluorinated alkyl, alkenyl, ether or ester groups attached directly to backbone silicon atoms (e.g. $D^F$), or indirectly through a diorganosiloxane segment attached to the backbone silicon atoms containing from 1 to about 10 silicon atoms (e.g. $D^R$). The presence of moieties partially compatible to fluorosilicones such as silanol and vinyl is desirable.

The resinous copolymer is toluene soluble and includes M units, ($R_3SiO_{\frac{1}{2}}$), where R is a hydrocarbon radical and Q units ($SiO_2$) present in the ratio of about 0.6:1 to about 0.9:1. Hydroxyl radicals are present in the amount of about 0.2 to about 5.0 weight percent, and preferably from about 1.0 to about 3.0 percent of the total resinous copolymer weight.

The polydiorganosiloxanes have repeating units of ($S_1R^1R^2O$) where $R^1$ and $R^2$ are independently selected from alkyl groups having 1 to about 10 carbon atoms, alkenyl groups having 1 to about 10 carbon atoms and aryl group such as phenyl or arylalkyl. The molecular weight of the polydiorganosiloxane should generally conform to a compound having a viscosity of at least 15M cps at 25° C. using a Brookfield viscometer. For low viscosities of about 5,000 cps a #5 spindle operating at 10 or 20 rpm is employed; for higher viscosities a #6 spindle operating at 10 or 20 rpm is employed.

The diluent solvent may be an aromatic toluene or xylene compound, ketones, acetone, methyl ethyl ketone compounds, halogenated hydrocarbon solvents such as trichlorol ethane, or mixtures of the above compounds. The diluent may be present in an amount sufficient to result in about 30 to about 60 weight percent solids of the total of Components (A), (B) and (C). The particular identity of the diluent solvent is not critical, although it is advantageous to select a solvent or diluent mixture which has sufficient solubility for Components (A), (B) and (C).

The invention is likewise directed to a cured PSA containing a reacted mixture of Components (A), (B) and (C) and trace amounts of Components (D) and (E).

In accordance with the invention, a stable and homogenous mixture of the resinous component in the polydiorganosiloxane is critical to the formation of a stable dispersion compositions because the miscibility between the fluorosilicone polymer and the silicone resin is limited. The stability of the dispersion can be influenced by the viscosity of fluorosilicones as well as the polysiloxanes. The homogenous or uniform dispersion of the components results in good coating uniformity.

DETAILED DESCRIPTION OF THE INVENTION

Figure 2:
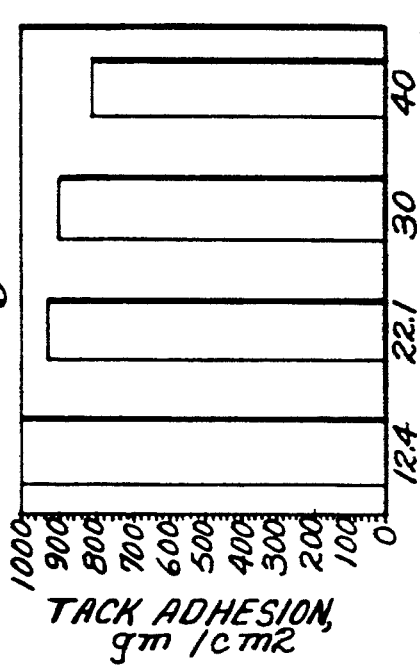
FIGS. 1-2 Illustrate graphically the relationship between the proportion of fluoropolymer in various PSA compositions and the adhesive properties of such compositions.

In accordance with the present invention, mixtures of (A) fluorosilicone polymers; (B) silanol containing MQ resins; and (C) resin compatible, diorganosiloxane polymers cured in the presence of a free radical generating initiator to form a cross-linked fluorosilicone matrix of high solvent resistance and pressure sensitive adhesive properties. A stable and homogenous mixture of the resinous component for (B) in the organosiloxane Component (C) is of critical importance to the formation of a stable composition. Two methods have been found successful in the preparation of stable compositions. In the first method, Component (A) is dispersed into a condensed mixture of (B) and (C). In the second method, homogeneity and stability of the dispersion is maximized by condensing available silanol groups of Components (A), (B) and (C) using a condensation catalyst.

Before setting forth the various experimental and exemplary illustrations, a general outline of the invention is set forth.

Fluorosilicone compositions curable to form pressure sensitive adhesives having good solvent resistance property are set forth below. The compositions comprise of (A) from about 5 to about 70 weight percent fluorosilicone polymers, preferably from about 20 to about 60, more preferably from about 35 to about 50 and still more preferably from about 40 to about 48; (B) from about 10 to about 60 weight percent of silanol-containing siloxane MQ resin, preferably from about 20 to about 40 and more preferably from about 30 to about 40; and (C) from about 10 to about 50 preferably from about 15 to about 35, more preferably from about 20 to about 30 and still more preferably from about 20 to about 25 weight percent of resin-compatible diorganosiloxane polymers, the total of (A), (B) and (C) being 100.

A diluent solvent, such as xylene, toluene, acetone and ethyl acetate or mixtures thereof, may be present to facilitate the dispersion of (A), (B) and (C), preferably up to about 60 and more preferably from about 30 to about 60 weight percent of the total of Components (A), (B) and (C). The above compositions cure, upon addition of a known free-radical generating initiator such as peroxide, or under some conditions a known catalyst such as platinum or tin, to form a cross-linked fluorosilicone matrix having high solvent resistance and pressure sensitive adhesive properties.

Component (A) provides good solvent resistance properties. In particular, these properties are obtained by the use of starting materials containing fluorosilicone homopolymers or copolymers of monomeric units containing $SiR^1R^2O$ also known as D, $SiR^1R^FO$ also known as $D^F$, $SiR^1R^3$ also known as $D^R$, $SiR^1_2R^2O_{\frac{1}{2}}$ also known as M unit or M" when alkenyl such as vinyl is present, $SiR^1R^2R^FO$ also known as $M^F$. Where $R^1$, $R^2$ are independently selected from alkyl groups having 1 to about 10 carbon atoms including methyl, ethyl, propyl, butyl, pentyl, hexyl, alkenyl groups having 1 to about 10 carbon atoms including vinyl, allyl, propenyl, or hexenyl, and aryl groups such as phenyl and arylalkyl. $R^3$ is a silicon-containing pendent group of a general formula —OSiR$^1$R$^2$R$^F$ where R$^1$, R$^2$ and R$^F$ are as described previously. The type of pendant R$^F$ group and relative amount of D$^F$, in the case of copolymers, affects the relative compatibility and stability among the three Components (A), (B) and (C), and determines the physical properties of the final composition.

It was found that fluorosilicone gums, and/or fluids of high viscosity, preferably at least 5000 cps at 25° C. are required to prepare stable compositions. Lower viscosities result in PSAs which may leave a residue upon removal from a test surface. Preferred fluorosilicone structures are high molecular weight gums or fluids containing silicone bonded organics including alkyls, aryls and arylalkyls preferably methyls and phenyls, and moieties including: trifluoroalkyls having 1 to about 8 carbon atoms, or fluorocyclics having 1 to about 8 carbon atoms; perfluorinated alkyls having 1 to about 8 carbon atoms, or perfluorinated cyclics having 1 to about 8 carbon atoms; or partially or fully fluorinated alkyl, alkenyl, ether or ester groups attached to backbone silicon atoms. The presence of moieties partially compatible to fluorosilicones, such as, silanol and vinyl, is desirable but not critical.

Resinous Component (B) can be present in a weight percent as low as 10 relative to the total weight of (A), (B) and (C). A toluene-soluble, resinous copolymer including $R_3SiO_{\frac{1}{2}}$ and $SiO_{4/2}$, otherwise respectively known as M and Q units, is needed at a ratio of 0.6:1 to about 0.9:1 in order to obtain desirable adhesive properties. The resinous copolymer also contains between about 0.2 to about 5.0 weight percent and preferably from about 1.0 to about 3.0 weight percent hydroxyl radicals relative to the total resin weight.

Polydiorganosiloxanes in Component (C) are polymerization products having repeating units of (SiR$^1$R$^2$O), wherein R$^1$ and R$^2$ are independently selected from alkyl groups containing 1 to about 10 carbon atoms, and aryl groups such as phenyl, or arylalkyl. The molecular weight of polysiloxanes should be great enough to result in a compound having a viscosity of at least 15M cps at room temperature (25° C.) using a Brookfield viscometer.

Component (C) is compatible with Component (B). Resin compatibility of diorganosilicone polymers in Component (C) is determined by the ability of both Components (B) and (C) forming a homogenous clear solution in a solvent medium, such as toluene, xylene or acetone.

The invention can be more fully understood with reference to the examples set forth below.

According to a first method, Component (A) is dispersed into a condensed mixture of Components (B) and (C).

A homogeneous mixture of an MQ resin and silicone polymer can be prepared by condensing (B) and (C) in the presence of a base catalyst or initiator. Silanol condensation catalyst is well known in the art. Condensation catalyst includes amine and carboxylic acid salt of Si, Pb, Sn, An, and Sb. Preferred silanol condensation catalysts are those dispersible in the mixture of Components (A), (B), and (C), particularly preferred silanol condensation catalysts are aminopropyl trimethoxysilane and potassium silanolate. The condensed mixture is preferred since more stable dispersion with fluorosilicones and improved adhesion properties can be obtained. High viscosity fluorosilicone polymers (A) can then be mechanically dispersed in (B) and (C) to form a stable dispersion mixture. Toluene, xylene or acetone is thereafter used to adjust the viscosity and solids content of the composition.

High solvent resistant PSA tapes can be made by curing a mixture wherein 1 to 5 percent by weight of the total solids of a free-radical generating catalyst such as benzoyl peroxide added to the composition.

EXAMPLE 1

High molecular weight fluorosilicone polymers of the following three exemplary general structural types were prepared:

A1: $M^{OR}$—(D$^F$)$_y$—$M^{OH}$ (a 100% fluoroalkyl substituted silanol terminated polyorganosiloxane fluid, having a viscosity of 85,000 cps at 25° C.).

A2: M"—(D)$_x$(D$^F$)$_y$—M" (a copolymer substituted silicon-bonded D$^F$, wherein M" represents a dialkylvinyl endstopped group). A2 is a fluid having a viscosity of about 25,000 cps at 25° C. and containing about 40 mole percent of fluorosilicone D$^F$ units.

A3: $M^{OH}$—(D$^R$)$_x$(D$^F$)$_y$(D")$_z$—$M^{OH}$ (a silanol stopped, fluorosilicone gum polymer of about 99 mole percent of trifluoropropyl methyl silicone, about 0.27 mole percent of vinyl methyl silicone, and less than about 1 mole percent of D$^R$ units, where R can be silicon-bonded $CF_3$—$(CH_2)_2$—$Si(CH_3)_2O$—, or $CF_2$=CH—$CH_2$—$Si(CH_3)_2O$—.

As described previously, D$^F$ is a repeating unit carrying a silicon-bonded fluoro-containing group, R$^F$.

The percentage of fluorosilicone content is expressed in terms of the ratio of D$^F$ to the total D units of the polymer, or as indicated, to the total weight percentage in the final composition.

EXAMPLE 2

A condensed silicone composition of about 52.8 wt. % of siloxane resin with about 47.2 wt. % phenyl and vinyl containing silicone gums was prepared by reacting 48.33 g of silicone resinous copolymers of M and Q units where M is trimethylsiloxane and Q is silica, in a ratio of 0.6 to 0.9 units of M to 1 unit of Q and about 2.0 percent by weight of silanol groups, based on total weight of siloxane resin (60 solids wt. % in an aromatic toluene or xylene solvent) with 19.73 g of a diphenyl-dimethyl siloxane gums containing about 5.3 mole % of the diphenyl group and 6.23 g of a methyl-vinyl diphenylsiloxane gum containing polyorganosiloxane with about 5.3 mole % diphenyl silicone and 2 mole % methyl-vinyl silicone. An aminopropyl trimethyoxysilane was used as a catalyst in a reflux condition to cause the formation of a slightly cross-linked and condensed composition. The mixture was determined to have 55 weight percent of nonvolatile solids and the balance being xylene solvent.

EXAMPLE 3

10 g of the condensed mixture of EXAMPLE 2, was added to 0.58 g of a type A2 fluorosilicone copolymer from EXAMPLE 1 (dimethyl vinyl terminated trifluoropropylmethyl silicone and dimethyl silicone copolymers containing about 40 mole % of trifluoropropyl silicone units). The materials were thoroughly mixed resulting in a homogeneous white milky dispersion. To this fluorosilicone composition, a solution of 0.12 g of benzoyl peroxide in 2.5 g toluene was added. The mixture was stirred to uniformity before use.

The mixture was evenly coated, using a Paul-Gardener blade coater set at 5.0, over a 1 mil polyester film substrate, then flash dried of volatile solvents in a 70° C. oven for about 2 minutes, then cured in a 170° C. forced air circulating oven for 3 minutes. A PSA film having a thickness of about 3.0 mil was obtained. A peel adhesion of 32 oz/in on a steel plate and a Polyken tack adhesion of 953+/−50 g/cm$^2$ was measured. The peel adhesion of the pressure sensitive adhesive was determined using a Scott Tester, using 180° pull at a rate of 12 inches/minute against a stainless steel plate. Tack was measured by means of a Polyken Probe Tack Tester, manufactured by Testing Machines Incorporated, which was fitted with a probe having a diameter of 0.5 centimeter and operated at a rate of 1 cm/sec and a dwell time of 1 second.

EXAMPLES 4 to 7

A type A1 silanol-stopped homopolymer, 99 plus percent fluorosilicone polymer (SS-FS) from EXAMPLE 1 (trifluoropropylmethyl silicone, having a viscosity of about 85,000 cps at 25°) was used along with the mixture prepared in EXAMPLE 2 in various proportions, resulting in the following compositions:

TABLE I

| Ex. # | Weight of Comp. 2 | Weight of SS-FS | Weight Percent MQ Resin | Weight % of Fluoro |
|---|---|---|---|---|
| 4 | 20 g | 1.55 g | 46.3 | 12.4 |
| 5 | 20 g | 3.12 g | 41.1 | 22.1 |
| 6 | 20 g | 4.7 g | 37.0 | 30.0 |
| 7 | 20 g | 7.3 g | 31.7 | 40.0 |

These compositions formed stable, milky white homogeneous dispersions. About 1.9 weight percent benzoyl peroxide was added relative to the total solids of these compositions. The benzoyl peroxide was added in the form of a toluene solution. The following peel and tack properties of the compositions of EXAMPLES 4–7 are shown below in Table II.

TABLE II

| Ex. # | thickness | Peel, oz/in | Tack, g/cm$^2$ |
|---|---|---|---|
| 4 | 1.7 mil | 34 | 997 |
| 5 | 1.7 mil | 33 | 934 |
| 6 | 1.4 mil | 31 | 912 |
| 7 | 0.6 mil | 25 | 539 |

According to a second method, a homogenized admixture of Components (A), (B) and (C) was condensed. Although it is entirely possible to obtain desirable properties from a homogenized mixture of Components (A), (B) and (C) in which Components (B) and (C) are each soluble in a diluent solvent, it was found that stability and homogeneity of the dispersion can be maximized by condensing available silanol groups of Components (A), (B) and (C) using a condensation catalyst. The choice of the silanol condensation catalyst has been described above. It was also found that the solvent-resistance property can be further improved over the ones prepared according to the first method.

EXAMPLE 8

To further illustrate the second method of preparation, a one-gallon reaction kettle was charged with the following components: 235 g of a type A1 silanol-stopped fluorosilicone polymer from EXAMPLES 1 and 4–7; and 197.3 g of the diphenyl-dimethyl siloxane gums, 62.3 g of a methyl-vinyl stopped diphenyldimethylsiloxane gums, and 483.3 g (a 60 wt. % solids solution) of an MQ resin from EXAMPLE 2. The mixture was azeotropically dried. About 0.08 weight percent of an aminosilane base catalyst (aminopropyltrimethyloxy silane) was thereafter added to cause the condensation at reflux condition for about 2 hours. The aminosilane was, neutralized and the mixture was tested for the percent solids and adhesive properties. The finished mixture had 63.7 weight percent non-volatile solids.

EXAMPLES 9 to 12

To the base composition prepared in EXAMPLE 8, additional type A1 silanol-stopped fluorosilicone polymer was added in various proportions to arrive at selected levels of fluoro content. The composition was catalytically cured with about 3 weight percent benzoyl peroxide as described above.

TABLE III

| Example # | Weight of Example 8 | Weight of SS-FS | Weight % of MQ | Weight % of Fluoro |
|---|---|---|---|---|
| 9 | 40 g | 0 g | 37.0 | 30.0 |
| 10 | 40 g | 5.0 g | 30.9 | 41.5 |
| 11 | 40 g | 10.0 g | 26.6 | 49.7 |
| 12 | 30 g | 15.0 g | 20.7 | 60.8 |
| 2 | — | — | 55 | 0.0 |

The swell ratio of cured PSAs in toluene provides a measure of solvent resistance. The swell ratio was measured by immersing a cured PSA film sample into a fresh toluene solvent for 7 minutes. Excessive solvent on the surface was blotted off by a napkin. The weight of the sample was measured before and after immersion. The swell ratio is the ratio of soaked weight to dry weight of PSA. The higher the swell ratio, the higher the solvent uptake and the lower the solvent resistance. The properties of cured PSAs having the above compositions are shown in the table below.

TABLE IV

| Example # | Thickness | Peel, oz/in | Tack, g/cm$^2$ | Swell Ratio |
|---|---|---|---|---|
| 9 | 1.1 mil | 30 | 708 | 3.1 |
| 10 | 1.3 mil | 27 | 686 | 2.9 |
| 11 | 2.5 mil | 27 | 733 | 2.3 |
| 12 | 2.3 mil | 28 | 679 | 2.3 |
| 2 | 1.6 mil | 27 | 819 | 4.0 |

Swell ratios less than 4.0 indicate good solvent resistance. This is due in part to the relatively high fluoro content of the compositions and the relatively low MQ resin content. Yet, with a resin content less than about 50 percent by weight, good pressure sensitive properties are nonetheless achieved.

EXAMPLE 13

A blend of a type A1 fluorosilicone fluid of 85M cps viscosity at 25° C. from EXAMPLES 1 and 4–7 and a fluorosilicone gum of type A3 from EXAMPLE I, which is a silanol-stopped, fluorosilicone gum polymer of about 99 mole percent of trifluoropropyl methyl silicone, about 0.27 mole percent of vinylmethyl silicone, and about less than 1 mole percent of D$^R$ unit, where R can be silicon-bonded CF$_3$—(CH$_2$)$_2$—Si(CH$_3$-)$_2$O—, or CF$_2$=CH—CH$_2$—Si(CH$_3$)$_2$O— in a solids weight percent ratio of 60:40 was heated to 150° C. and hand stirred until the fluid was thoroughly mixed into the gum. The resulting fluorosilicone blend, in a weight percent of 29.8, was thereafter mixed thoroughly at 70° C. for 20 minutes with 53.2 weight percent of an organosilicone PSA containing 52.8 wt. % MQ resin and an additional 4 weight percent of an MQ resin (60% solids in xylene solution) from EXAMPLE 2. The resulting mixture was combined with 13 weight percent toluene diluent. The resulting master batch, containing 48.5 wt. % fluorosilicone, 29.0 wt. % MQ resin and 22.5 wt. % organosiloxanes, was further modified as follows.

EXAMPLE 14

40 grams of the master batch from EXAMPLE 13 was mixed with 0.74 g of benzoyl peroxide and 10 grams of toluene, resulting in a composition having a 48.5 to 29.0 weight percent ratio of fluorosilicone to MQ resin.

EXAMPLE 15

40 grams of the master batch from EXAMPLE 13 was mixed with 4 g of the same MQ resin, 0.74 g of benzoyl peroxide and 8 g of toluene. The latter being a predissolved solution resulting in a composition having a 44.3 to 35.1 weight percent ratio of fluorosilicone to MQ resin.

EXAMPLE 16

40 g of the master batch from EXAMPLE 13 was mixed with 8 g of the same MQ resin, 0.74 g of benzoyl peroxide and 6 g of toluene in a predissolved solution resulting in a composition having a 40.7 to 40.0 weight percent ratio of fluoro silicone to MQ resin.

Table V below illustrates the resulting peel strength in pounds per inch of various PSA compositions formulated in accordance with the present invention before and after soaking in various solvents. The temperatures and soak times are indicated.

TABLE V

| Tape Sample Compositions | Example 14 | Example 15 | Example 16 |
|---|---|---|---|
| Wt % Fluoro | 48.5 | 44.3 | 40.7 |
| Wt % MQ resin | 29.0 | 35.1 | 40.0 |
| PEEL strength lb/in width control (dry | 3.7 | 4.5 | 7.7 |
| 4H/70° F./JP-4 Fluid | 0.6 | 0.4 | 0.35 |
| 4H/120° F./hydraulic fluid | 1.25 | 0.9 | 1.25 |
| 4H/120° F./engine oil | 2.1 | 1.75 | 2.05 |

EXAMPLE 17

Two types of copolymers were mixed thoroughly by stirring at 150° C. to create a homogeneous mixture. The starting materials were 62.5 g of a type A1 fluid, having a viscosity of about 85,000 cps at 25° C. from EXAMPLES 1 and 4–7 and 37.5 g of a type A3 gum from EXAMPLES 1 and 13 having the structure: [$M^O-H$—$D^R_xD^F_yD''_z$—$M^{OH}$] for a silanol terminated, copolymer of trifluoropropyl methyl silicone, and methyl vinyl silicone, in which x is typically less than 1 mole percent, y is 99 mole percent and z is 0.27 mole percent, having a Williams Plasticity of between 140 and 240.

EXAMPLE 18

20 g of the material prepared in EXAMPLE 17 and 20 g of the material prepared in EXAMPLE 2 were mixed in a high shear mechanical mixer to maximize homogenization to yield a composition of about 19 wt. % MQ resin, 64 wt. % fluoropolymer and 17 wt. % of phenylsilicone gum. A catalyst solution of 0.74 g of benzoyl peroxide in 5 g of toluene was added to the mixture. A uniform coating of about 3 mil over a 1 mil polyester film was prepared and cured as described in EXAMPLE 3.

EXAMPLE 19

20 g of the material prepared in EXAMPLE 17 and 15 g of the material prepared in EXAMPLE 2 were mixed as in the previous example to yield a composition of about 16 wt. % MQ resin, 70 wt. % fluoropolymer and 14 wt. % of a phenylsilicone gum. A catalyst solution of 0.87 g of benzoyl peroxide in 6 g of toluene was added to the mixture. A uniform coating of about 4 mil over a 1 mil polyester film was prepared and cured. The properties for various ratios of MQ resin to fluoropolymer are shown in Table VI.

TABLE VI

|  | Example 18 | Example 19 |
|---|---|---|
| Wt. % MQ resin | 19 | 16 |
| Wt. % Fluoropolymer | 64 | 70 |
| Peel Adhesion | 27 oz/in | 22 oz/in |
| Residue on steel plate | None | Very slight |
| Probe Tack Adhesion | 559 g/cm$^2$ | 446 g/cm$^2$ |
| Swell Ratio in toluene | 1.86 | 1.77 |

The Table suggests that for EXAMPLE 19, where clear removal is required, a level of less than 15 wt. % MQ resin and over 70 wt. % fluoropolymer is not desirable because residue may develop. Also, peel adhesion of 22 oz/in is near a desired lower limit.

EXAMPLES 20–21

Fluorosilicone polymers corresponding to types A2 or A3 structures were made with 6200 cps and 1228 cps respectively. Two fluorosilicone compositions were prepared by mixing 7.3 g of a fluorosilicone fluid with 30 g of a composition prepared in EXAMPLE 2 (57 % solids in xylene) to form a homogeneous dispersion mixture. A catalyst solution of 0.61 g of benzoyl peroxide in 6 g of toluene was added to the mixture. A uniform 1.3 to 2 mil coating over a 1 mil polyester film was prepared and cured. The resulting properties are set forth in Table VII below.

TABLE VII

|  | EXAMPLE 20 | EXAMPLE 21 |
|---|---|---|
| Wt. % MQ resin | 37.1 | 37.1 |
| Wt. % Fluorosilicone | 30 | 30 |
| Fluorosilicone viscosity | 6200 cps | 1228 cps |
| Cured PSA Thickness | 1.3 mil | 2.0 mil |
| Peel Adhesion | 39 oz/in | 27 oz/in |
| Residue on Steel Plate | none | oily film |
| Tack Adhesion | 700 g/cm$^2$ | 710 g/cm$^2$ |

The Table suggests that for EXAMPLE 21, there is a lower viscosity limit of about 1228 cps at 25° C. for useful PSA applications employing fluorosilicone polymers. The limit is generally determined in those instances where an oily residue is left behind on a test surface. It is thought that there is an insufficient locking in of the fluorosilicone component in a cured matrix due to its low molecular weight as indicated by viscosity. A practical long limit for eliminating any residue is about 5000 cps at 25° C. and is preferably about 6200 cps for the example given.

Figure 4:
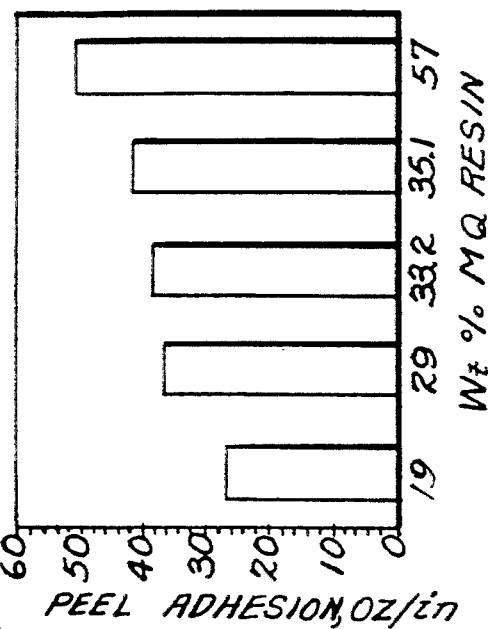
FIG. 4 illustrates the relationship between the proportion of MQ resin in various PSA compositions and the resulting peel adhesion.
Figure 1:
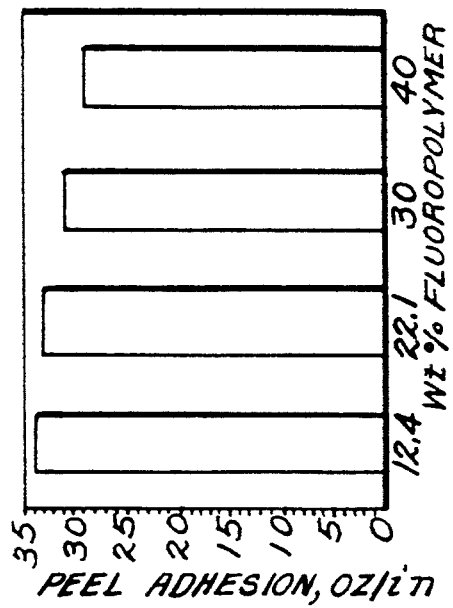
Figure 3:
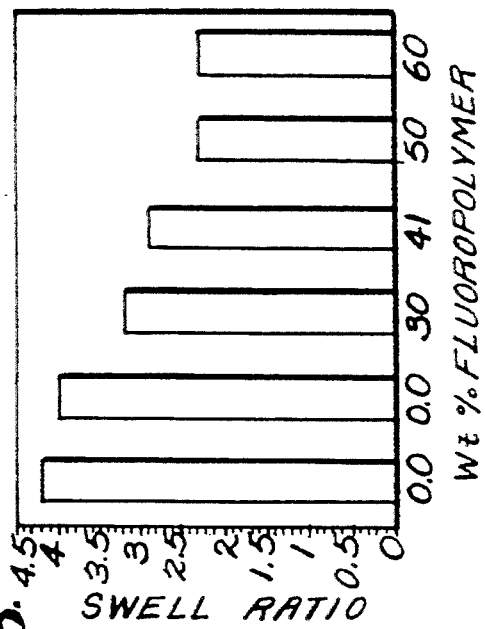
FIG. 3 illustrates the relationship between the proportion of fluoropolymer in various PSA compositions and the resulting swell ratio.

FIGS. 1–4 graphically illustrate the general effect on the properties of various PSA compositions as the proportions of components are changed. For example, in FIGS. 1 and 2, although the adhesion and tack tend to decrease with increasing fluoropolymer content, nevertheless good adhesion and tack result with such fluoropolymer PSAs. In FIG. 3 swell ratios of 4 or greater result when the fluoropolymer is absent from the composition. However, the swell ratio decreases significantly with as little as 30 wt. % fluoropolymer. In FIG. 4 it can be seen that peel adhesion decreases with decreasing MQ resin content. Good adhesion is achieved with as little as 19 wt. % MQ resin content as shown in EXAMPLE 18. From the foregoing, it can be appreciated that PSAs having desired properties can be obtained in which preferably Component (A) is present in a wt. % of about 35 to 50 and Component (B) is present in a wt. % of about 30 to 40 and Component (C) is present in a wt. % of about 20 to 30.

While there have been described what are considered to be the preferred embodiments of the present invention, it will be apparent to those skilled in the art that various changes may be made therein without departing from the invention and it is intended in the claims to cover such changes and modifications as fall within the true spirit and scope of the invention.

What is claimed is:

1. A fluorosilicone composition cured in the presence of a free radical generating cross-linking initiator or catalyst and diluent to form a pressure sensitive adhesive having high solvent resistance comprising by weight:
   (A) about 5 to 70 percent fluorosilicone polymers;
   (B) about 10 to 60 percent of a silanol containing MQ resin; and
   (C) about 10 to 50 percent of resin compatible diorganosiloxane polymers having (SiR$^1$R$^2$O) repeating units where R$^1$ and R$^2$ are independently selected from alkyl groups having 1 to about 10 carbon atoms, alkenyl groups having 1 to about 10 carbon atoms or an aryl group, Components (A), (B) and (C) substantially equaling 100 weight percent solids.

2. The fluorosilicone composition of claim 1, wherein Component (A) is present in an amount ranging from about 20 to about 60 weight percent.

3. The fluorosilicone composition of claim 1, wherein Component (A) is present in an amount ranging from about 35 to about 50 weight percent.

4. The fluorosilicone composition of claim 3, wherein (A) is present in an amount by weight of about 40 to about 48%.

5. The fluorosilicone composition of claim 1, wherein Component (B) is present in an amount ranging from about 20 to about 40 weight percent.

6. The fluorosilicone composition of claim 5, wherein (B) is present in an amount by weight of about 0 to about 40%.

7. The fluorosilicone composition of claim 1, wherein Component (C) is present in an amount ranging from about 15 to about 35 weight percent.

8. The fluorosilicone composition of claim 1, wherein Component (C) is present in an amount ranging from about 20 to about 30 weight percent.

9. The fluorosilicone composition of claim 8, wherein (C) is present in an amount by weight of about 20 to about 25%.

10. The fluorosilicone composition of claim 1, when the free radical generating cross-linking initiator or catalyst is present in an amount of about 1 to about 5 weight percent.

11. The fluorosilicone composition of claim 1, wherein the diluent is present in an amount of about 30 to about 60 weight percent solids of the total of Components (A), (B) and (C).

12. The fluorosilicone composition of claim 1, wherein (A) has a viscosity of at least 5000 cps at 25° C. and is selected from the group consisting of a high molecular weight (HMW) fluorosilicone (FS) gum and a high molecular weight (HMW) fluorosilicone (FS) fluid.

13. The fluorosilicone composition of claim 12, wherein (A) contains:
   silicon bonded groups, including at least one of alkyls containing from 1 to about 8 carbon atoms; fluorochemicals including trifluoroalkyls of 1 to about 8 carbon atoms; fluoroalkyl cyclics of 1 to about 8 carbon atoms; perfluorinated alkyls of 1 to about 8 carbon atoms, perfluorinated cyclics of 1 to about 8 carbon atoms, and partially or fully fluorinated alkyl, alkenyl, ether or ester groups attached directly to backbone silicon atoms or indirectly through a diorgano siloxane segment attached to the backbone silicon atoms containing from 1 to 10 silicon atoms.

14. The fluorosilicone composition of claim 13, further including vinyl or silanol moieties.

15. The fluorosilicone composition of claim 1, wherein the resin includes M and Q units in a ratio of about 0.6:1 to about 0.9M units to 1 Q unit.

16. The fluorosilicone composition of claim 1, wherein the resin contains hydroxyl radicals present in the amount of about 0.2 to about 5.0 weight percent.

17. The fluorosilicone composition of claim 16, wherein the resin contains hydroxyl radicals present in an amount of about 1.0 to about 3.0 weight percent.

18. The fluorosilicone composition of claim 1, wherein the polydiorganosiloxanes having a viscosity of at least 15M cps at 25° C.

19. The fluorosilicone composition of claim 1, wherein the diluent is selected from xylene, toluene, acetone and ethyl acetate compositions.

20. A pressure sensitive adhesive formed by reacting components comprising by weight:
   (A) about 5 to about 70 percent of a fluorosilicone polymer having a viscosity of at least 5000 cps at 25° C.;
   (B) about 10 to about 60 percent of a resinous copolymer including R$_3$SiO$_{\frac{1}{2}}$ where R is a hydrocarbon radical and SiO$_2$ units present in a ratio of about 0.6:1 to about 0.9:1 and hydroxy radicals making up about 0.2 to about 5.0 weight percent of the total resinous copolymer weight;
   (C) about 10 to about 50 percent polydiorganosiloxanes having repeating units of the general formula SiR$^1$R$^2$O, wherein R$^1$ and R$^2$ are independently selected from the group consisting of an alkyl having from 1 to about 10 carbon atoms, alkenyl having from 1 to about 10 carbon atoms, an aryl and an arylalklyl;
   (D) up to about 60 weight percent of the total of Components (A), (B) and (C) of a diluent solvent; and
   (E) about 1 to 5 solids weight percent of the total of Components (A), (B) and (C) of a free radical generating initiator or catalyst, said adhesive being curable upon mixing of said free radical generating initiator or catalyst with said components (A), (B) and (C).

21. An adhesive as defined in claim 20, wherein Component (A) contains silanol or vinyl moieties.

22. An adhesive as defined in claim 20, wherein Component (A) comprises a fluorosilicone homopolymer of monomeric units of the formula $SiR^1R^FO$ wherein $R^1$ is selected from alkyls having 1 to about 10 carbon atoms, aryl or arylalkyl, and $R^F$ is selected from partially or fully fluorinated alkyl, alkenyl, ether or ester groups.

23. A cured fluorosilicone pressure sensitive adhesive formed by components comprising by weight:
(A) about 5 to about 70 percent of a fluorosilicone polymer having a viscosity of at least 500 cps at 25° C.;
(B) about 10 to about 60 percent of a resinous copolymer including $R_3SiO_{\frac{1}{2}}$ units where R is a hydrocarbon radical and $SiO_{e,fra\ 4/2\times}$ units present in a ratio of about 0.6:1 to about 0.9:1 and hydroxy radicals making up about 0.2 to about 5.0 weight percent of the total resinous copolymer weight;
(C) about 10 to about 50 percent polydiorganosiloxanes having repeating units of the general formula $SiR^1R^2O$, wherein $R^1$ and $R^2$ are independently selected from the group consisting of an alkyl having from 1 to about 10 carbon atoms, alkenyl having from 1 to about 10 carbon atoms, an aryl and an arylalkyl, and the total amount of Components (A), (B) and (C) substantially equaling 100 percent by weight, and being cured into a cross-linked matrix, having trace amounts of (D) a diluent solvent; and (E) a free radical generating initiator or catalyst.

* * * * *